(12) United States Patent
Melideo

(10) Patent No.: US 7,441,205 B2
(45) Date of Patent: *Oct. 21, 2008

(54) DISPLAYING AND ACTIVATING TELEPHONE NUMBERS

(75) Inventor: John Melideo, Westlake Village, CA (US)

(73) Assignee: Jambo Acquisition, LLC, Westlake Village, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/840,889

(22) Filed: May 7, 2004

(65) Prior Publication Data

US 2004/0260413 A1 Dec. 23, 2004

Related U.S. Application Data

(63) Continuation of application No. 10/614,394, filed on Jul. 3, 2003.

(60) Provisional application No. 60/471,535, filed on May 19, 2003.

(51) Int. Cl.
*G06F 3/00* (2006.01)
*H04L 12/66* (2006.01)

(52) U.S. Cl. .................. 715/835; 715/765; 715/821; 715/205; 379/93.23

(58) Field of Classification Search ............... 715/700, 715/764, 765, 772, 781, 810, 821, 846, 856, 715/862, 501.1, 503, 526, 528, 530, 531, 715/562, 835, 205, 212, 255, 256, 273, 275; 345/157, 426, 581, 589; 379/90.01, 93.23, 379/142, 93.21, 142.01, 142.03, 142.15
See application file for complete search history.

(56) References Cited

U.S. PATENT DOCUMENTS

| 5,396,590 A | 3/1995 | Kreegar |
| 5,452,289 A | 9/1995 | Sharma et al. |
| 5,483,352 A | 1/1996 | Fukuyama |
| 5,754,636 A * | 5/1998 | Bayless et al. ........... 379/142.1 |
| 5,790,638 A | 8/1998 | Bertacchi |
| 5,867,562 A * | 2/1999 | Scherer |
| 5,905,964 A | 5/1999 | Sudo |
| 5,940,488 A | 8/1999 | DeGrazia |

(Continued)

FOREIGN PATENT DOCUMENTS

JP    2002101465    * 4/2002

(Continued)

OTHER PUBLICATIONS

"ALCATEL: US West liberates Internet from PCs with new Alcatel 'Web-Phone'." May 11, 1999, M2 Presswire.*

(Continued)

*Primary Examiner*—X. L Bautista
(74) *Attorney, Agent, or Firm*—SoCal IP Law Group LLP; Mark Andrew Goldstein; Steven C. Sereboff

(57) ABSTRACT

There are disclosed methods and apparatus for displaying telephone numbers included in data units. The data units are scanned for telephone numbers. The telephone numbers are automatically identified within the data units. When the telephone numbers are displayed as part of displays of the data units, the telephone numbers are conspicuously rendered.

33 Claims, 4 Drawing Sheets

U.S. PATENT DOCUMENTS

| | | | |
|---|---|---|---|
| 5,944,791 A | 8/1999 | Scherpbier | |
| 6,005,928 A | 12/1999 | Johnson | |
| 6,011,794 A | 1/2000 | Mordowitz et al. | |
| 6,028,917 A | 2/2000 | Creamer et al. | |
| 6,031,836 A * | 2/2000 | Haserodt | 370/389 |
| 6,069,890 A | 5/2000 | White et al. | |
| 6,100,873 A | 8/2000 | Bayless | |
| 6,115,461 A | 9/2000 | Baiyor | |
| 6,130,933 A | 10/2000 | Miloslavsky | 379/90.01 |
| 6,141,413 A | 10/2000 | Waldner | |
| 6,144,667 A | 11/2000 | Doshi | |
| 6,184,796 B1 | 2/2001 | Rivero | |
| 6,249,576 B1 * | 6/2001 | Sassin et al. | 379/218.01 |
| 6,263,365 B1 | 7/2001 | Scherpbier | |
| 6,275,490 B1 | 8/2001 | Mattaway et al. | |
| 6,317,781 B1 | 11/2001 | De Boor | |
| 6,332,024 B1 * | 12/2001 | Inoue et al. | 379/433.06 |
| 6,337,858 B1 | 1/2002 | Petty et al. | |
| 6,385,191 B1 | 5/2002 | Coffman | |
| 6,445,468 B1 | 9/2002 | Tsai | |
| 6,470,079 B1 | 10/2002 | Benson | |
| 6,570,964 B1 | 5/2003 | Murveit et al. | |
| 6,600,503 B2 | 7/2003 | Stautner et al. | |
| 6,670,968 B1 | 12/2003 | Schilit | |
| 6,678,864 B1 | 1/2004 | Tsai | |
| 6,707,811 B2 | 3/2004 | Greenberg et al. | |
| 6,731,630 B1 | 5/2004 | Schuster | |
| 6,834,048 B1 | 12/2004 | Cho | |
| 6,870,828 B1 * | 3/2005 | Giordano, III | 370/352 |
| 6,913,091 B2 * | 7/2005 | Wentworth et al. | |
| 6,954,524 B2 | 10/2005 | Gibson | |
| 6,996,221 B1 | 2/2006 | Baiyor | |
| 7,035,384 B1 * | 4/2006 | Scherer | |
| 7,058,356 B2 * | 6/2006 | Slotznick | 455/3.05 |
| 7,080,049 B2 * | 7/2006 | Truitt et al. | 705/75 |
| 7,092,496 B1 * | 8/2006 | Maes et al. | 379/88.01 |
| 7,106,851 B2 | 9/2006 | Tang et al. | |
| 7,110,368 B2 | 9/2006 | Perry | |
| 7,170,995 B2 | 1/2007 | Johnson | |
| 7,215,744 B2 * | 5/2007 | Scherer | |
| 7,222,304 B2 | 5/2007 | Beaton | |
| 7,295,836 B2 | 11/2007 | Yach et al. | |
| 2001/0055951 A1 * | 12/2001 | Slotznick | 455/41 |
| 2002/0082892 A1 * | 6/2002 | Raffel et al. | 705/8 |
| 2002/0083093 A1 | 6/2002 | Goodisman et al. | 707/511 |
| 2002/0089938 A1 | 7/2002 | Perry | |
| 2002/0104090 A1 | 8/2002 | Stettner | |
| 2002/0128036 A1 * | 9/2002 | Yach et al. | 455/552 |
| 2002/0143808 A1 * | 10/2002 | Miller et al. | 707/501.1 |
| 2003/0014754 A1 | 1/2003 | Chang | |
| 2003/0050045 A1 | 3/2003 | Kennedy | |
| 2003/0050837 A1 | 3/2003 | Kim | |
| 2003/0079024 A1 | 4/2003 | Hough et al. | |
| 2003/0140091 A1 | 7/2003 | Himmel | |
| 2003/0185232 A1 | 10/2003 | Moore et al. | |
| 2003/0197744 A1 | 10/2003 | Irvine | |
| 2003/0228011 A1 * | 12/2003 | Gibson | 379/211.02 |
| 2004/0021697 A1 | 2/2004 | Beaton | |
| 2004/0032948 A1 | 2/2004 | Johnson | |
| 2004/0078476 A1 * | 4/2004 | Razdow et al. | 709/229 |
| 2004/0122810 A1 | 6/2004 | Mayer | |
| 2004/0141599 A1 * | 7/2004 | Tang et al. | 379/93.24 |
| 2004/0192263 A1 * | 9/2004 | Tomikawa et al. | 455/413 |
| 2004/0240642 A1 | 12/2004 | Crandell et al. | |
| 2004/0252820 A1 | 12/2004 | Faber | |
| 2005/0114210 A1 * | 5/2005 | Faber et al. | 705/14 |
| 2005/0289471 A1 | 12/2005 | Thompson et al. | |

FOREIGN PATENT DOCUMENTS

WO      WO 00/05679    *   3/2000

OTHER PUBLICATIONS

Darlene Fichter et al, "Click to talk: Web phones spell opportunIPy for libraries", Jan./Feb. 2001, vol. 25, No. 1, p. 48-51, Online Inc.*

Bill N. Schilit et al, "m-links: An infrastructure for very small internet devices", 2001, ACM Press, p. 122-131.*

C. J. Weigand, Indispensible software on-line, Home Office Computing, Apr. 1992, v10 n4 p20.

Rosenberg, J. and Schulzrinne, H. SIP Event Packages for Call Leg and Conference State. Mar. 1, 2002. http://www.jdrosen.net/sip_callpkg.html.

Porter, Brad. Call Control Requirements in a Voice Browser Framework. Apr. 13, 2001. http://www.w3.org/TR/call-control-reqs/.

* cited by examiner

DISPLAYING AND ACTIVATING TELEPHONE NUMBERS

RELATED APPLICATION INFORMATION

This application claims priority from Provisional Patent Application No. 60/471,535 filed May 19, 2003, which is incorporated herein by reference.

This application is a continuation of U.S. patent application Ser. No. 10/614,394, filed Jul. 3, 2003, which is incorporated herein by reference.

NOTICE OF COPYRIGHTS AND TRADE DRESS

A portion of the disclosure of this patent document contains material which is subject to copyright protection. This patent document may show and/or describe matter which may or may not become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to enhancing displayable text.

2. Description of Related Art

A graphical user interface or GUI is a graphical representation or presentation of information. Various options that provide the user with the ability to manipulate information and data may be presented in a GUI that may consist of a window or menu. For example, customer information such as a customer name, contact name, address, and zip code may be presented to a user in a visually appealing manner such that the words "Customer Name" appear next to a text field box with a space for a name, the words "Contact Name" appear next to a text field box with a space for a name, the word "Address" appears next to a text field box with a space for an address, and the words "Zip Code" appear next to a text field box with a space for a zip code. The field names (i.e., Customer Name, Contact Name, Address, and Zip Code) may be displayed in a specific font or color with the text field boxes (or the information in the text field boxes) in the same or different font or color. Thus, the GUI provides for the display of the information.

Commonly, a GUI representation of information is displayed in a window with several standard components that are displayed regardless of the type, style, or content of the information to be displayed by the GUI. A display may be contained within a frame. The top of the window may have a title bar for which a title may be specified. Below title bar may be a menu bar. The menu bar may be associated with various capabilities. The menu bar may have various submenus. Each submenu may be a menu itself or a command that can be selected by the user.

A "web browser" is an application program used for viewing HTTP (web) files and navigating through linked web files. The web files may include hyperlinks which, when activated by the user cause a corresponding web page to be displayed. Hyperlinks may also cause other events, such as the launching of programs or routines (e.g., causing a blank email message to be opened with a predefined address).

Efforts have been made in integrating the Web with telephony applications. One such popular application is the placing of telephone calls from PC to a regular telephone. A user can place a call to a regular telephone from the Web using Dialpad (Dialpad Communications, Inc.) or Net2Phone (Net2Phone, Inc.). In these applications, a user must manually enter a telephone number each time he wishes to initiate a call, or pick a telephone number from a structured list stored by and only available from the dialing application. In view of the success of such products and services, one could conclude that the users were satisfied and there has been no motivation to seek other solutions.

Some companies, in conjunction with their sales and customer-support efforts, have added a "call me" or "call-back" function to their web sites. With these functions, a user who browses to the company's web site may then manually enter his own telephone number and other information into a web page. The company's computers then initiate the call back to the user.

DETAILED DESCRIPTION OF THE INVENTION

Throughout this description, the embodiments and examples shown should be considered as exemplars, rather than limitations on the apparatus and methods of the present invention.

Description of the System

Figure 1:
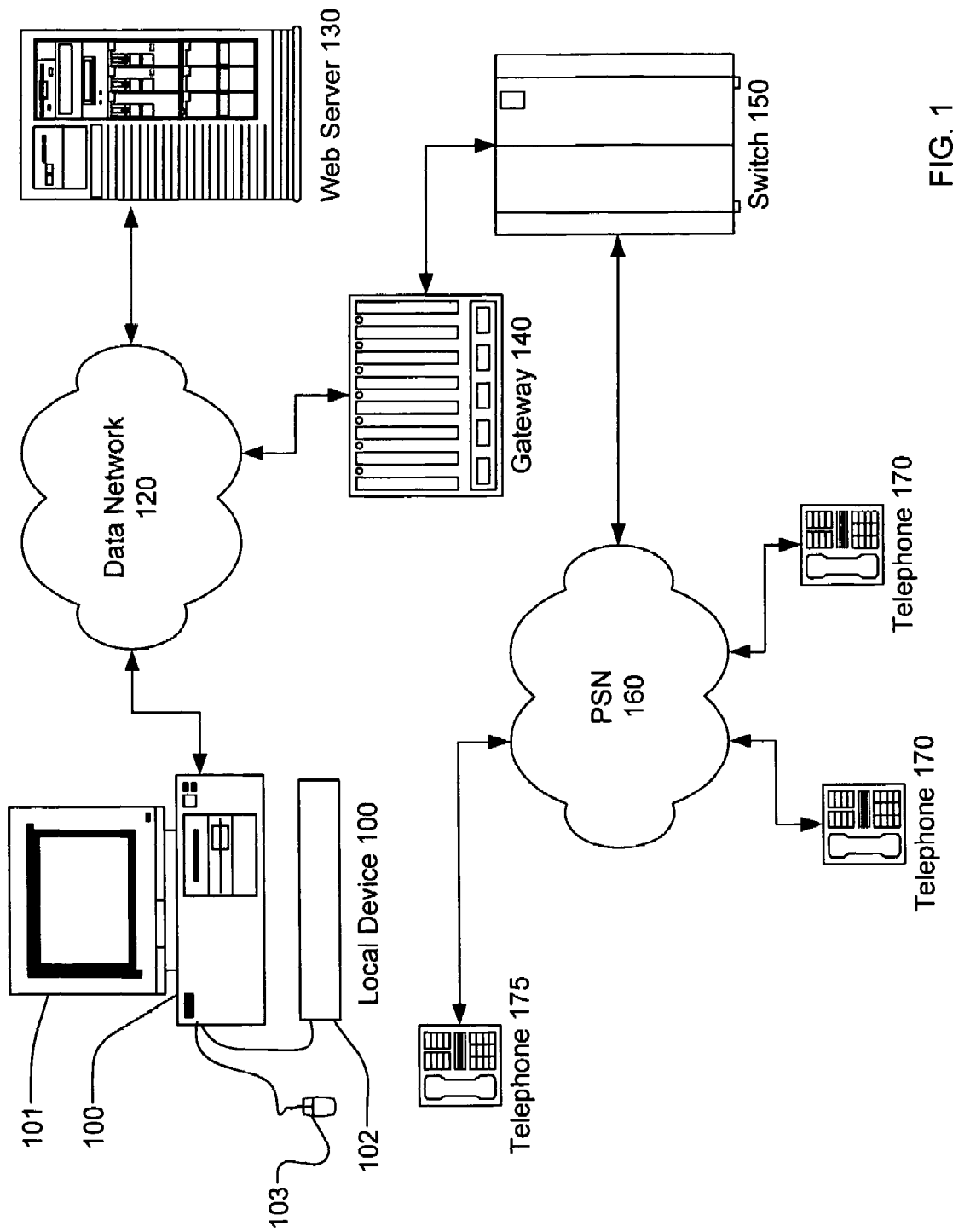
FIG. 1 is a block diagram of an environment in accordance with the invention.

Referring now to FIG. 1, there is shown a block diagram of an environment in accordance with the invention. The system includes a client computer 100, a data network 120, a web server 130, a gateway 140, a switch 150, a public switched network (PSN) 160 and plural telephones 170.

The client computer 100 may comprise a general purpose computer. The client computer 100 may be, for example, a PC running a Microsoft Windows operating system. The client computer 100 may include an output device, such as a display 101, and an input device, such as a keyboard 102 and/or a pointing device 103 (e.g., mouse, track ball, light pen, or data glove). The client computer 100 may be a computing device such as a workstation, server, portable computer, personal digital assistant (PDA), computing tablet, two-way messaging device (e.g., Blackberry™), smart display terminal, and the like. The client computer 100 connects with and communicates on the data network 120 and includes an interface therefore. The client computer 100 may comprise an assembly of devices, such as a television and a set-top box which interfaces to the data network 120.

The client computer 100 includes software and/or hardware for providing the functionality and features of the invention. The client computer 100 may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the client computer 100 may include various specialized units, circuits, software and interfaces for providing the functionality and features of the invention. The invention may be embodied in whole or in part in software which operates on the client computer 100 and may be in the form of an application program, an applet (e.g., a Java applet), a browser plug-in, a COM object, a dynamic linked library (DLL), a script, one or more subroutines, an operating system component or service, or a terminate and stay resident program (TSR). The hardware and software of the invention and its functions may be distributed such that some components are performed by the client computer 100 and others by other devices.

The data network 120 provides lower layer network support for the client computer 100 to interact with other devices, including the web server 130 and the gateway 140. The data network 120 is packet-switched and may comprise a common or private bi-directional data network, and may be, for example the Internet.

The web server 130 may be of the type known in the art and has the ability to serve web pages to the client computer 100, as requested in the manner known in the art. It should be appreciated that the web server 130 is representative of any source of web pages available to the client computer 100. Thus, for example, the web server 130 could be accessible from the Internet, or it could be a part of an intranet and represents any number of web servers.

The PSN 160 is a common carrier network which provides circuit switching and/or IP telephony between public users. The PSN 160 may be the public switched telephone network (PSTN). The PSN 160 may operate according to standards such as SS6 or SS7.

The telephones 170 may be ordinary analog telephones connected to the PSN. The telephones 170 may be digital devices (e.g., SIP devices or telephone sets connected through a PBX) for providing voice communications. The telephones 170 may also be wireless voice communications devices such as cell phones. There may be one or more telephones 175 located proximate the client computer 100, or in a location under common control of the user of the client computer 100. The telephone 175 is of the same type as the telephone 170.

The switch 150 may be a voice switch, circuit switch and/or an IP switch and may be compliant with standards such as SS6 or SS7. The switch 150 is compatible with the PSN 160, and has the ability to set up and tear down telephone connections in the PSN 160.

The gateway 140 interfaces between the packet-switched data network 120 and the switch 150. The gateway 140 may be a signaling gateway platform (SGP), which is an intelligent service exchange node that integrates services between circuit and packet networks. The gateway 140 may be integrated into the PSN 160 or the switch 150.

Description of the Methods

Figure 2:
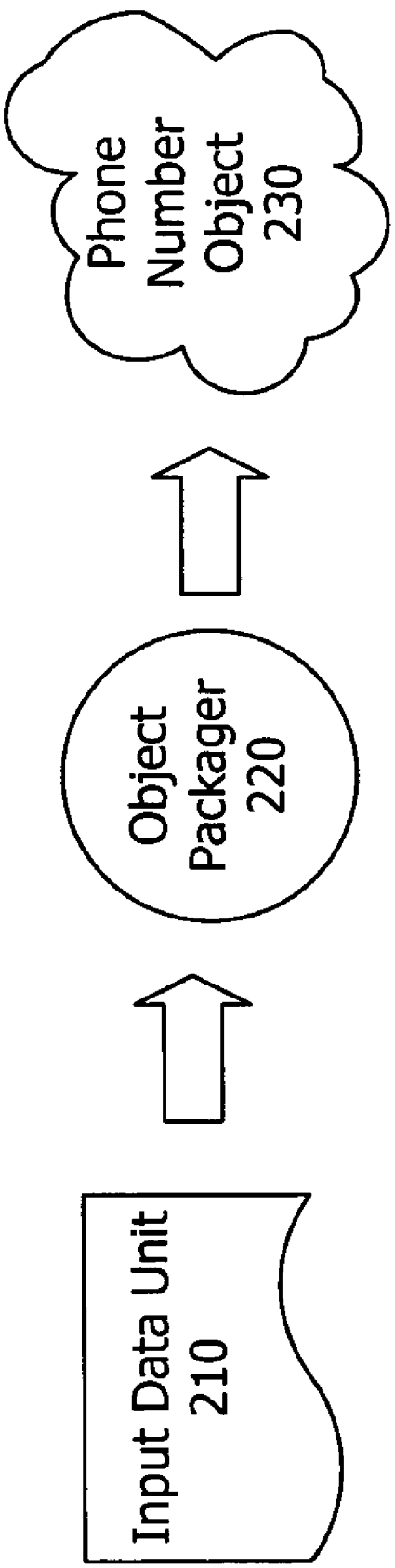
FIG. 2 is a data flow diagram in accordance with the invention.

Referring now to FIG. 2, there is shown a data flow diagram in accordance with the invention. A unit of data 210 is passed through an object packager 220. The object packager 220 recognizes a telephone number in the data unit 210 and packages a phone number object 230 corresponding to the telephone number. The phone number object 230 may be embedded in the data unit 210, or may be separate.

The phone number object 230 may include one or more telephone numbers. For example, each telephone number in a data unit may correspond to a single object. Alternatively, each data unit may have a single phone number object for all of its telephone numbers. Alternatively, there may be a single phone number object for all telephone numbers identified by the client computer 100, or for all telephone numbers for a given application program.

By "data unit," it is meant a defined group of data. The data unit 210 must be of a type which can include a telephone number which is displayable on a display (e.g., display 101 in FIG. 1) and thereby viewable by a human. The data unit 210 may consist only of contiguous text (e.g., an ASCII text file), or may consist of a mixture of displayable and non-displayable data (e.g., a word processing document). The data unit may be a file or may be part of a file. The data unit 210 may comprise a number of objects (e.g., contact information used in a contact management program). The text in the data unit 210 may be encoded, such as in ASCII. The data unit 210 may be, for example, an email message, an instant message (IM), a spreadsheet, a web page, a record in a contact management database, or a word processing document.

The phone number object 230 may include the telephone number and/or may include a reference to the telephone number within the data unit 210. The phone number object 230 is defined such that the telephone number is activatable. Once activated, a telephone call may be initiated from a trigger from the client computer 100 through the data network 120 to the switch 150 via the gateway 140. The telephone call may be a dual leg telephone call which connects the user's telephone 175 and one or more other telephones 170 via the PSN 160. In the dual leg telephone call, one leg is used to dial the user's telephone directly, while the other terminates the telephone call to a telephone associated with a telephone number associated with the displayed phone number object. That is, the trigger causes the switch to place a call to the user's telephone and a call to a telephone number associated with the displayed phone number object, and then bridge the two calls together. The trigger may identify the telephone numbers to be dialed.

Although the phone number object 230 may be considered as an "object" in the sense of object-oriented programming, the phone number object 230 may transcend the limitations of object-oriented programming. Thus, the phone number object 230 may represent, for example, a flag in a data structure which is used to indicate performance of a separate subroutine. The phone number object 230 may be viewed as including "hooks" for allowing initiation of telephone calls using the corresponding telephone number. The phone number object 230 therefore is a shorthand for an attachment between a displayed telephone number and telephone call initiation functions.

Figure 3:
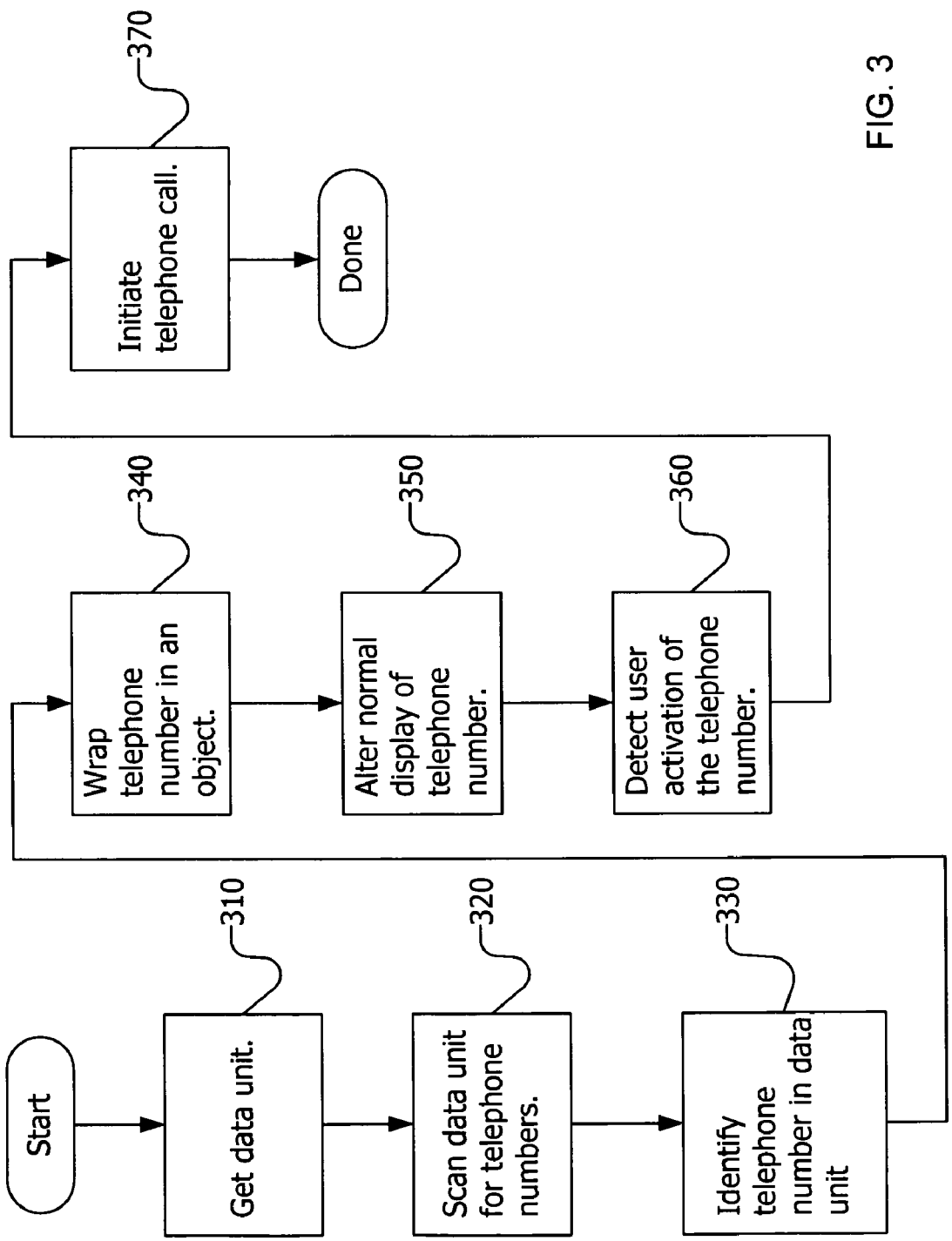
FIG. 3 is a flow chart of a method of displaying a telephone number as an active object in accordance with the invention.

Referring now to FIG. 3, there is shown a flow chart of a method of displaying telephone numbers by the client computer 100 in accordance with the invention.

In a first step (step 310), a data unit is presented. A data unit may be "presented" when the data unit is passed to a functional unit which will perform later processing. In this case, the functional unit is considered to be passive. Alternatively, a data unit may be "presented" when a functional unit which will perform later processing fetches the data unit. In this case, the functional unit is considered to be active.

All data units available to the client computer 100 may be presented. However, it may be desirable to limit presentation of data units to those of certain characteristics. Presentation may be limited or triggered based upon data characteristics such as storage location (e.g., specified folders), file type, file format, data format or file size.

Presentation may also be limited or triggered based upon events, such as when particular application programs call up data units, or when data units are about to be displayed. When the user makes a selection (e.g., of an icon or option), such selection is referred to as an "event." Upon the occurrence of an event, an action or command may be initiated.

Presentation may also be limited or triggered by a combination of data characteristics and events. For example, step 310 may be performed only on word processing documents, spreadsheet documents, email documents, instant messages (IM), contact files and web pages. Furthermore, step 310 may be further restricted such that it is performed only when the corresponding application is displaying the data unit.

Next, the data unit is scanned for telephone numbers (step 320). The data unit may be parsed or otherwise processed using one or more algorithms for identifying telephone numbers. For example, the data unit may be scanned for a series of numerals in the exact pattern "(XXX) XXX-XXXX." Alternatively, a more generic algorithm would search for a series of four or more digits, with no intervening characters except a dash or matched parentheses. The particular algorithm used will depend on a number of factors, including the degree of desired accuracy, the processing capabilities of the client computer, the desired efficiency or speed, and the types of telephones numbers which should be identified.

After telephone numbers are identified (step 330), the telephone numbers may be wrapped as phone number objects (step 340).

Steps 330-340 may be performed on all or only a limited number of telephone numbers per data unit. Step 340 may be performed on all telephone numbers within a data unit, or may be limited to those telephone numbers having desired qualities.

The user may be provided with options to control which data units are processed. This may be useful if the display of a source document must remain true. For example, a user may wish that data units located in a particular folder, or having a particular file format, or having some format of file name, should be skipped. There may be available to the user a display of options, such that the display lists which applications and which file types are available for processing, and the user can make selections or deselections as desired. Also, data files may include an indicator that their display should not be altered.

Steps 310-340 are performed automatically, and may always begin or may always be completed before the data unit is displayed. Steps 310-340 may be performed in conjunction with, as a consequence of, or be triggered by a command, instruction or event to display the data unit. For example, a normal display function may be altered to cause steps 310-340 to be performed.

When the telephone numbers are displayed as part of a display of the data unit, the telephone numbers have a display attribute which renders the telephone numbers conspicuous to a user (step 350). Step 350 may be performed in a number of ways. In one alternative, a normal display of the data unit may be altered prior to display such that the telephone numbers will be conspicuous. For example, just prior to display of a web page, HTML tags and JavaScript may be added so that the telephone numbers will be displayed by the browser and provided with appropriate functionality (e.g. click-to-call). The format of the tags may follow the standard http://URL format, may have a custom format, or otherwise. The tags may include a target source which determines when and how the telephone call will be initiated.

In a second alternative, immediately after a normal display, the telephone numbers or the entire data unit may be redisplayed such that the telephone numbers are conspicuous. In a third alternative, the normal display of the telephone numbers may be overlaid with the conspicuous attributes.

A telephone number may be made conspicuous in many ways. For example, the displayed telephone number may have a distinctive color or font, or it may be underlined or highlighted. The telephone number may be displayed such that it appears identical or similar to a hyperlink. The display may be conspicuous at all times, or may be temporary, such as on mouse roll-over. The conspicuous display may be a "right-click" menu, so that when a user uses a mouse to click on the telephone number with a secondary mouse button, a menu of options may be displayed adjacent the telephone number.

Furthermore, different types of telephone numbers may have different attributes. For example, local and toll-free telephone numbers may be displayed in one color (e.g., green), and long distance telephone numbers may have a different color (e.g., blue).

Once displayed, the user may wish to activate the telephone number. Thus, an activation instruction by the user of a displayed telephone number may be detected (step 360). Next, a telephone call is caused to be initiated using the displayed telephone number (step 370). This initiation may be achieved by sending a call trigger to a switch to initiate a dual leg telephone call. In the dual leg telephone call, one leg is used to dial the user's telephone directly, while the other terminates the telephone call to a telephone associated with the displayed telephone number. That is, the trigger causes the switch to place a call to the user's telephone and a call to the displayed telephone number, and then bridge the two calls together.

Figure 4:
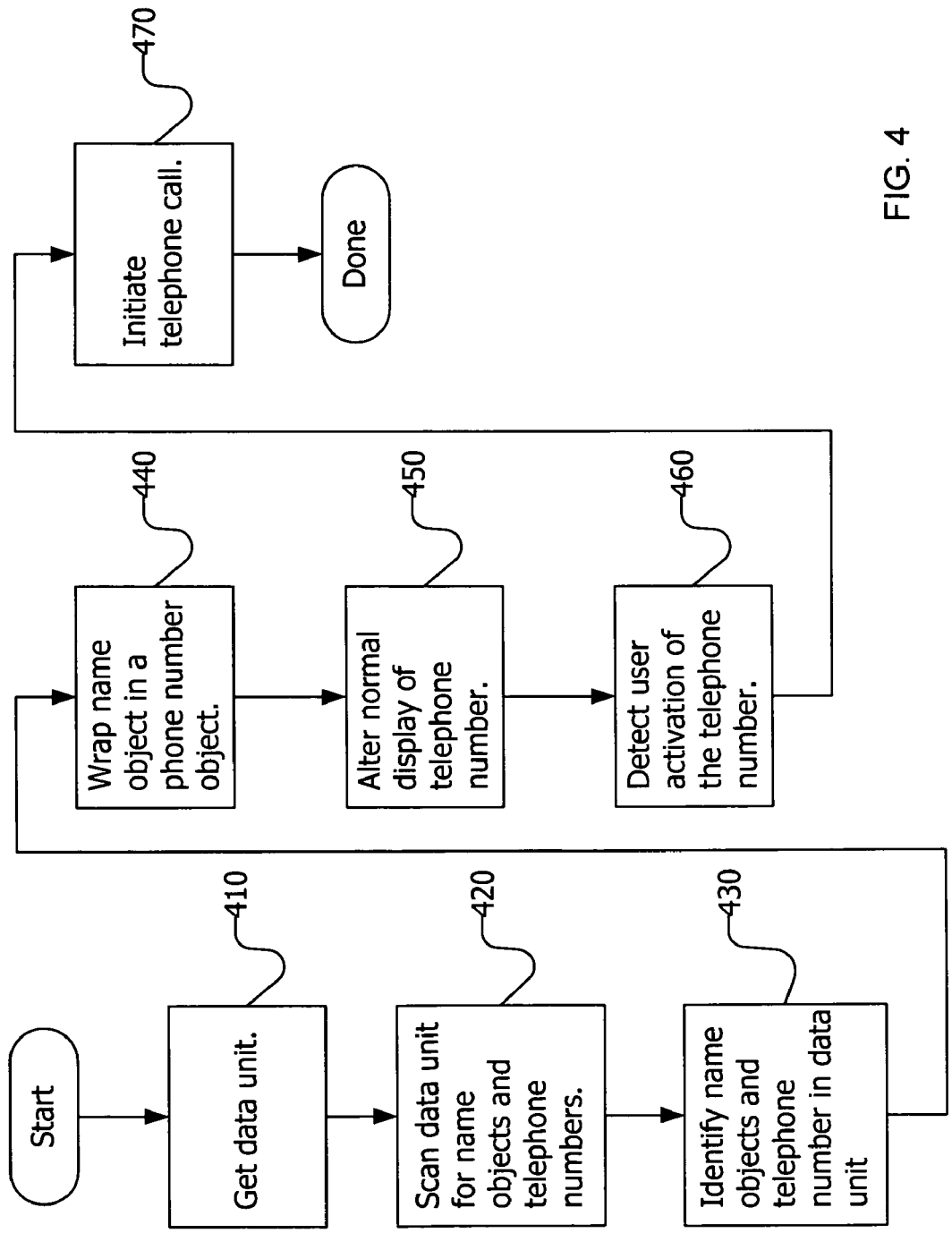
FIG. 4 is a flow chart of a method of displaying an object associated with a telephone number as an active object in accordance with the invention.

Referring now to FIG. 4, there is shown a flow chart of a method of displaying an object associated with a telephone number as an active object in accordance with the invention. This method is useful, for example, for databases which have objects such as peoples' names associated with a telephone number. These objects are not telephone numbers or like telephone numbers, but because of their intended usage they are associated with a telephone number. For convenience, these objects will be referred to as "name objects." The term "name objects" is not limited to names, though.

For example, contact management databases typically store records comprising a contact's name and one or more telephone numbers for the contact. In such a case, it may be desirable to provide streamlined activation of the associated telephone number if the user activates a display of the contact's name. In this example, the contact's name is a name object.

In a first step (step 410), a data unit is presented in the manner discussed with respect to step 310 (FIG. 3). Next, the data unit is scanned for name objects and telephone numbers (step 420), in a manner akin to that discussed with respect to step 320 (FIG. 3). After the name objects and telephone numbers are identified (step 430), the name objects may be wrapped as phone number objects (step 440).

Steps 430-440 may be performed on all or only a limited number of the name objects and the telephone numbers per data unit. Step 440 may be performed on all name objects and telephone numbers within a data unit, or may be limited to those name objects and/or telephone numbers having desired qualities.

Steps 410-440 are performed automatically, and may always begin or may always be completed before the data unit is displayed. Steps 410-440 may be performed in conjunction with, as a consequence of, or be triggered by a command, instruction or event to display the data unit. For example, a normal display function may be altered to cause steps 410-440 to be performed. Alternatively, steps 410-440 may be performed in a database system in conjunction with creating, modifying or accessing records.

When the name objects are displayed as part of a display of the data unit, the name objects have a display attribute which renders the name objects conspicuous to a user (step 450) in a manner akin to that discussed with respect to step 350 (FIG. 3).

Once displayed, the user may wish to activate the name object. Thus, an activation instruction by the user of a displayed name object may be detected (step 460). Next, a telephone call is caused to be initiated using the telephone number associated with the displayed name object (step 470). This initiation may be achieved by sending a call trigger to a switch to initiate a dual leg telephone call. In the dual leg telephone call, one leg is used to dial the user's telephone directly, and the other terminates the call to a telephone associated with the telephone number associated with the name object. That is, the trigger causes the switch to place a call to the user's telephone and a call to the telephone number associated with the displayed name object, and then bridge the two calls together.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

The invention claimed is:

1. A method of displaying telephone numbers by a client computer, the method performed within the client computer and comprising:
   receiving a first telephone number associated with a first telephone, the first telephone distinct from the client computer
   automatically scanning a data unit for telephone numbers
   automatically identifying at least one telephone number within the data unit as an identified telephone number, wherein each of the identified telephone numbers is associated with one of a plurality of second telephones distinct from the client computer and distinct from the first telephone
   embedding objects in the data unit, the objects to allow for initiation of telephone calls using the identified telephone numbers, wherein the objects define a function for sending a data trigger to a switch to initiate a dual leg telephone call between the first telephone and one of the second telephones
   displaying the data unit, including conspicuously rendering the identified telephone numbers.

2. The method of displaying telephone numbers of claim 1 wherein the data unit comprises a web page.

3. The method of displaying telephone numbers of claim 1 further comprising:
   detecting an activation of one of the identified telephone numbers by the user
   initiating the dual leg telephone call between the first telephone and the second telephone associated with the activated identified telephone number.

4. The method of displaying telephone numbers by a client computer of claim 3
   wherein the initiating comprises causing a dual leg voice telephone call to be initiated between the first telephone associated with a user of the client computer and the second telephone.

5. The method of displaying telephone numbers of claim 1 wherein the scanning, the automatically identifying, and the embedding are performed before the displaying.

6. The method of displaying telephone numbers of claim 1 wherein the conspicuously rendering is achieved according to a display attribute associated with the identified telephone numbers.

7. The method of displaying telephone numbers of claim 6,
   wherein the display attribute comprises one or more from the group comprising a distinctive color, underlining, and a distinctive font.

8. The method of rendering telephone numbers as objects of claim 6,
   wherein the display attribute comprises highlighting on mouse roll-over.

9. The method of rendering telephone numbers as objects of claim 5,
   wherein the display attribute comprises a right-click menu.

10. The method of rendering telephone numbers as objects of claim 6,
    wherein the display attribute is included in the object associated with the identified telephone numbers.

11. The method of displaying telephone numbers of claim 1
    wherein the data units comprise web pages.

12. A client computer for displaying telephone numbers, the client computer comprising:
    a user input device
    a display device
    a processor
    a memory
    wherein the processor and the memory comprise circuits and software for
       receiving a first telephone number associated with a first telephone, the first telephone distinct from the client computer
       automatically scanning data units for telephone numbers
       automatically identifying the telephone numbers within the data units as identified telephone numbers, wherein each of the identified telephone numbers is associated with one of a plurality of second telephones distinct from the client computer and distinct from the first telephone
       embedding objects in the data units, wherein the objects define a function for sending a data trigger to a switch to initiate a dual leg telephone call between one of the second telephones associated with one of the identified telephone numbers and the first telephone,
       displaying the data units, including conspicuously rendering the identified telephone numbers.

13. The client computer for displaying telephone numbers of claim 12
    wherein the data units comprise web pages.

14. The client computer for displaying telephone numbers of claim 12 further comprising circuits and software for
    detecting an activation of a displayed telephone number by a user
    initiating the dual leg telephone call between the first telephone and the second telephone associated with the activated identified telephone number.

15. The client computer for displaying telephone numbers of claim 14
    wherein the data units comprise web pages.

16. The client computer for displaying telephone numbers of claim 14 wherein the initiating comprises
    initiating a dual leg voice telephone call between the first telephone associated with a user of the client computer and the second telephone associated with the activated identified telephone number.

17. The client computer for displaying telephone numbers of claim 12,
    wherein the scanning, the automatically identifying, and the embedding are performed before the displaying.

18. The client computer for displaying telephone numbers of claim 12,
wherein the conspicuously rendering is achieved according to a display attribute associated with the identified telephone numbers.

19. The client computer for displaying telephone numbers of claim 18,
wherein the display attribute comprises one or more from the group comprising a distinctive color, underlining, and a distinctive font.

20. The client computer for displaying telephone numbers of claim 18,
wherein the display attribute comprises highlighting on mouse roll-over.

21. The client computer for displaying telephone numbers of claim 18,
wherein the display attribute comprises a right-click menu.

22. The client computer for displaying telephone numbers of claim 18,
wherein the display attribute is included in the object associated with the telephone number.

23. A client computer including software to conspicuously display telephone numbers included in data units, the software which when executed by the client computer causes the client computer to perform operations comprising:
receiving a first telephone number associated with a first telephone, the first telephone distinct from the client computer
automatically scanning the data units for telephone numbers
automatically identifying the telephone numbers within the data units as identified telephone numbers, wherein each of the identified telephone numbers is associated with each of a group of second telephones distinct from the client computer and distinct from the first telephone
embedding objects in the data units, wherein the objects define a function for sending a data trigger to a switch to initiate dual leg telephone calls using the identified telephone numbers, wherein the telephone calls are between the first telephone and one of the second telephones
displaying the data units, including conspicuously rendering the identified telephone numbers.

24. The client computer of claim 23 including software to cause the client computer to perform further operations comprising:
detecting an activation of an identified telephone number by a user
initiating the dual leg telephone call between the first telephone and the second telephone associated with the activated identified telephone number.

25. The client computer of claim 24 wherein the initiating comprise
initiating a dual leg voice telephone call between the first telephone associated with a user of the client computer and the second telephone associated with the activated identified telephone number.

26. The client computer of claim 23,
wherein the data units comprise web pages.

27. The client computer of claim 23,
wherein the scanning, the automatically identifying, and the embedding are performed 28. The client computer of claim 23,
wherein the conspicuously rendering is achieved according to a display attribute associated with the identified telephone numbers.

29. The client computer of claim 28,
wherein the display attribute comprises one or more from the group comprising a distinctive color, underlining, and a distinctive font.

30. The client computer of claim 28,
wherein the display attribute comprises highlighting on mouse roll-over.

31. The client computer of claim 28,
wherein the display attribute comprises a right-click menu.

32. The client computer of claim 28, wherein the display attribute is included in the object associated with the identified telephone numbers.

33. The client computer of claim 28
wherein the data units comprise web pages.

* * * * *